(No Model.)
J. SCHRODER.
HOSE COUPLING.
No. 348,059. Patented Aug. 24, 1886.
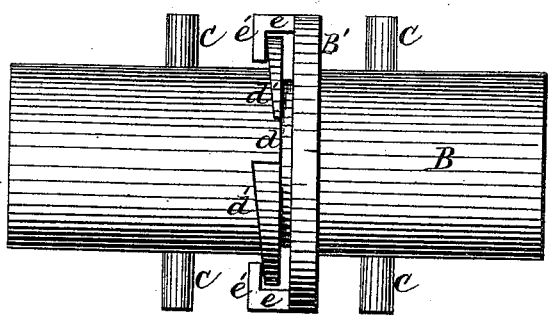
Fig. 1
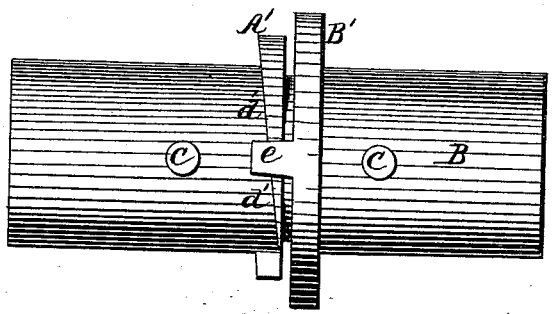
Fig. 2.
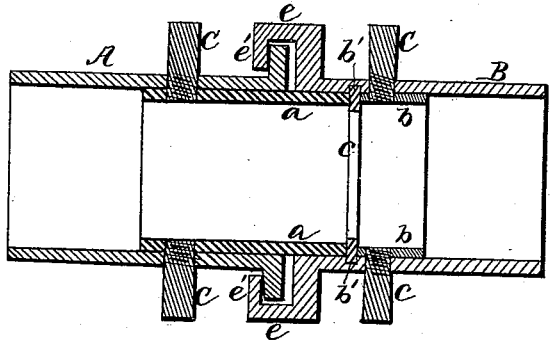
Fig. 3.
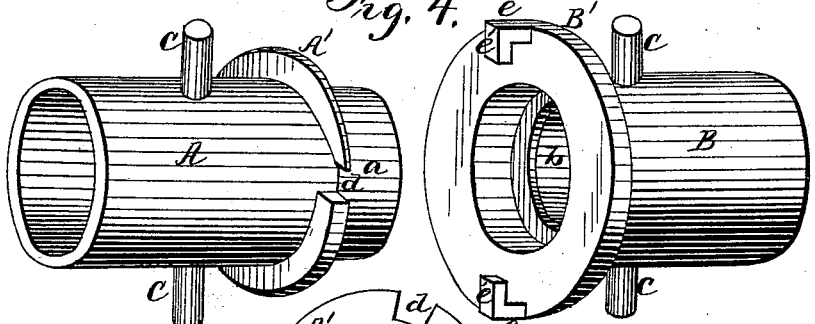
Fig. 4.
Fig. 5
Witnesses:
Inventor:

UNITED STATES PATENT OFFICE.

JOHN SCHRODER, OF TAMA CITY, IOWA, ASSIGNOR OF ONE-HALF TO WALTER C. MURRY, OF SAME PLACE.

HOSE-COUPLING.

SPECIFICATION forming part of Letters Patent No. 348,059, dated August 24, 1886.

Application filed June 7, 1886. Serial No. 204,308. (No model.)

*To all whom it may concern:*

Be it known that I, JOHN SCHRODER, a citizen of the United States, residing at Tama City, in the county of Tama and State of Iowa, have invented new and useful Improvements in Hose-Couplings, of which the following is a specification.

My invention relates to hose-couplings of that class in which the parts are readily coupled and uncoupled by an inclined flange on the one engaging with a corresponding projection on the other, said coupling and uncoupling being accomplished by a partial revolution of the parts relative to each other, in a manner well understood.

The object of my improvement is to simplify, cheapen, and reduce the amount of material to a minimum in the production of such devices, and at the same time render them efficient and durable, and more especially in making a quicker coupling in case of fire.

It consists in the specific construction hereinafter set forth and claimed, and shown in the accompanying drawings, in which—

Figure 1 is a side view of a coupler of my construction. Fig. 2 shows a similar view. Fig. 3 is a central longitudinal section. Fig. 4 shows the coupling parts detached, and Fig. 5 an end view of one of the coupling parts.

The coupler is composed of the two parts A and B, provided with flanges A' B', respectively. The parts are preferably of a corresponding bore, and are provided with short tubes $a$ and $b$, secured to the inner side of each by pins C, screwed through the sides of each part and into the tubes. To insure a close joint between the coupling parts and their respective short tubes, solder is placed between the tubes and their parts and heat applied, which, fusing the solder, will cause it to run and fill any intervening space between the tubes and the parts. The joint thus produced is what is commonly called a "sweat-joint," and while the union of the parts is effecting the pins serve to hold the tubes in place within the parts. Said pins also answer as a means to receive the wrench for coupling and uncoupling the parts.

The tube $a$ projects beyond the flange A', and is adapted to enter the part B and approach close to the end of the tube $b$, which terminates at a distance from the mouth of the part B. Between the ends of the tubes $a$ and $b$ is located a rubber washer or packing-ring, $c$, to make a water-tight joint when the parts are coupled together. This packing-ring rests on the end of the tube $b$, and is held in place against accidental displacement when the parts are uncoupled by being sprung into an annular groove, $b'$, in the part B adjacent the end of the tube $b$. This construction also permits the packing-ring to be evenly seated on the end of the tube $b$, so that when compressed between the ends of the tubes it will give equally on each side.

Flange A' has notches $d$ formed therein diametrically opposite each other, and the rear side of each part $d'$ of the flange intercepted by the notches is correspondingly inclined. Hooked arms $e$, projecting from the face of the flange B', to correspond with the notches $d$ in the flange A', have their hooked ends $e'$ projecting over said flange, and, riding upon the inclined faces $d'$ thereof, draw the parts together. The length of the arms and the thickness of the rear ends of the intercepted parts $d'$ are so proportioned that when the arms are in register with the notches the hooked ends will contact with said rear ends and prevent a backward movement of the parts relative to each other. This is an important feature, as it facilitates the uncoupling of the parts, the movement of which is limited when the hooked arms are in register with the notches.

I claim—

1. The combination, with the coupling part A, having end beveled flanges and an interior separately-fixed tube, $a$, projecting from said coupling part, of the part B, having hooked arms, an interior wall groove, and a separately-fixed short tube, $b$, placed within said part B, back of and joining the said groove, and the packing-ring $c$, sprung into and projecting from said groove against the end of said inner tube, whereby the packing is retained and the coupling packed by the joining ends of the interior tubes, $a\,b$, and the ring $c$ by the turning of one coupling part upon the other, as set forth.

2. The herein-described hose-coupler, comprising parts A and B, provided with flanges A' B', respectively, tubes $a$ and $b$, secured in place by a sweat-joint, pins C, screwed through the parts and into the tubes, packing-ring $c$, sprung into an annular groove cut in the part B adjacent the end of the tube $b$, and hooked arms projecting from flange B', to correspond with notches $d$, formed in the edge of the flange A', diametrically opposite each other, the rear side of the intercepted parts $d'$ of the flange A' being correspondingly inclined, and the rear ends of rear intercepted parts and the length of the arms being relatively proportioned, whereby movement of the parts is limited in one direction when the hooked arms are in register with the notches, as and for the purpose set forth.

In testimony whereof I have hereunto set my hand in the presence of two subscribing witnesses.

JOHN SCHRODER.

Witnesses:
H. T. POTTER,
E. C. DAVENPORT.